March 31, 1942.  R. S. WALTERS  2,278,394
CONVERTIBLE COMBINE AND SWATHER
Filed Jan. 23, 1939    3 Sheets-Sheet 1

Inventor
Ralph S. Walters

March 31, 1942.   R. S. WALTERS   2,278,394
CONVERTIBLE COMBINE AND SWATHER
Filed Jan. 23, 1939   3 Sheets-Sheet 2
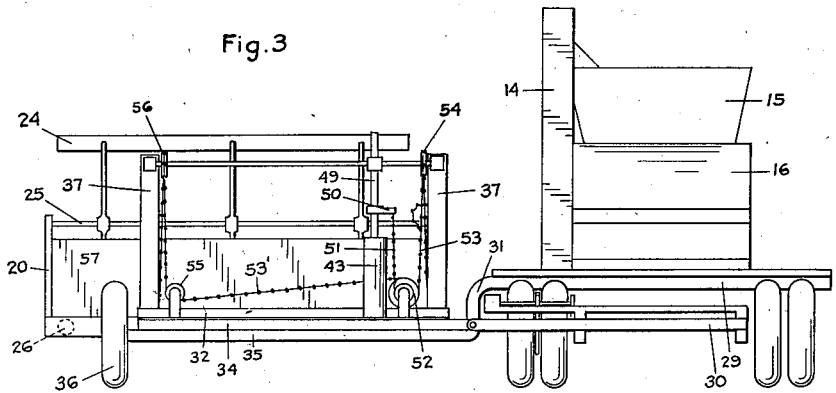
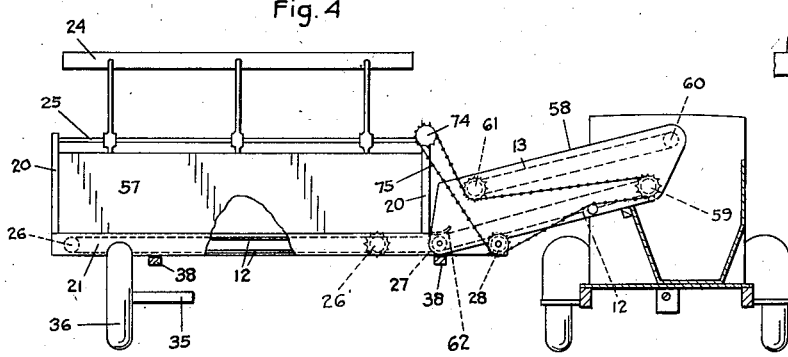
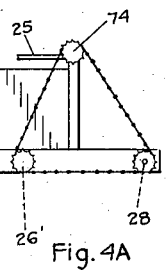
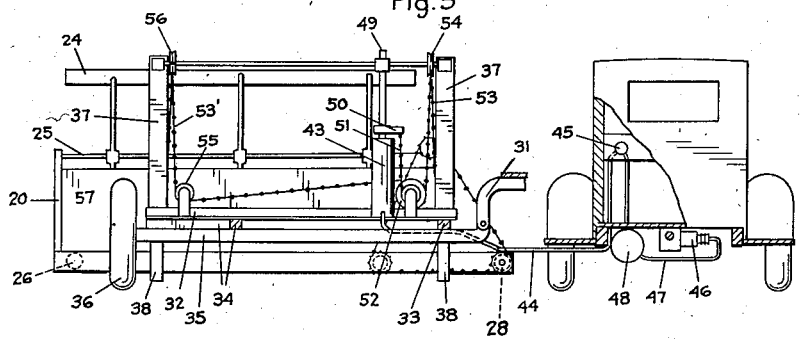
Inventor
Ralph S. Walters
By Emil F. Lange
Attorney March 31, 1942.  R. S. WALTERS  2,278,394
CONVERTIBLE COMBINE AND SWATHER
Filed Jan. 23, 1939   3 Sheets-Sheet 3

Inventor
Ralph S. Walters
By Emil F. Lange
Attorney

Patented Mar. 31, 1942

2,278,394

UNITED STATES PATENT OFFICE 2,278,394

CONVERTIBLE COMBINE AND SWATHER

Ralph S. Walters, Grant, Nebr.

Application January 23, 1939, Serial No. 252,382

7 Claims. (Cl. 56—20)

My invention relates to combined harvesters and thrashers, generally known as combines, and its primary object is the provision of a combine which is attachable to and detachable from the ordinary commercial or farm truck, the truck serving not only as a support for the combine but also providing the motive power for driving the harvesting mechanism as well as the motive power for propelling the truck.

My main object is the provision of a separating mechanism together with a prime mover which are so arranged and secured together as to provide a balanced construction which may be supported in balanced relation on a commercial or farm truck and which may be removed as a unit from the truck, combined with harvesting mechanism which may be releasably secured to the truck at one side thereof, and combined also with means for conveying grain from the harvesting mechanism to the separating mechanism.

Another of my objects is the provision of a thrashing mechanism which is adapted to be secured to rest on the body of a truck and adapted to receive the unthrashed grain from the harvesting mechanism which is secured at the side of the truck and which is supported at its inner extremity by the truck and at its outer extremity by an independent wheel support.

Another of my objects is the provision of a truck supported separating mechanism combined with harvesting mechanism at the side of the truck and having driving mechanism for utilizing the draft of the truck to drive the harvesting mechanism with means for disconnecting the separating mechanism to convert the combine into a swather.

Another of my objects is the provision of a combine in which the separating mechanism is supported on the body of a truck with harvesting mechanism at the side of the truck and having means for utilizing the motive power of the truck for adjustably raising or lowering the harvesting mechanism, the raising and lowering means being under the control of the driver in the cab of the truck.

Another of my objects is the provision of a harvesting mechanism which may be secured to or released from a commercial or farm truck, together with means within convenient reach of the driver of the truck for controlling the elevation of the cutting mechanism.

Another object which I have in view is the provision of a combine which is convertible into a swather, the entire mechanism being designed for use with a commercial or farm truck.

Another of my objects is the provision of separating mechanism which is adapted to rest as a balanced unit on the chassis of a truck, and combined with harvesting mechanism which is adapted to be releasably secured to the truck at one side thereof and so positioned that the harvesting operation is always in the view of the driver of the truck.

Having in view these objects and others which will be pointed out in the following description, I will now refer to the drawings, in which Figure 1 is a view in side elevation of my combine with parts in the foreground omitted for the sake of clarity.

Figure 3 is a view in rear elevation of the truck and combine with the omission of some of the parts supported on the truck.

Figure 4 is a sectional view on the line 4—4 of Figure 2 looking in the direction of the arrows.

Figure 4A is a view of a slight change which is made in the sprocket connections when the implement is to be used as a swather.

Figure 5 is another sectional view on the line 5—5 of Figures 1 and 2 as seen when looking in the direction of the arrows.

Figure 1:
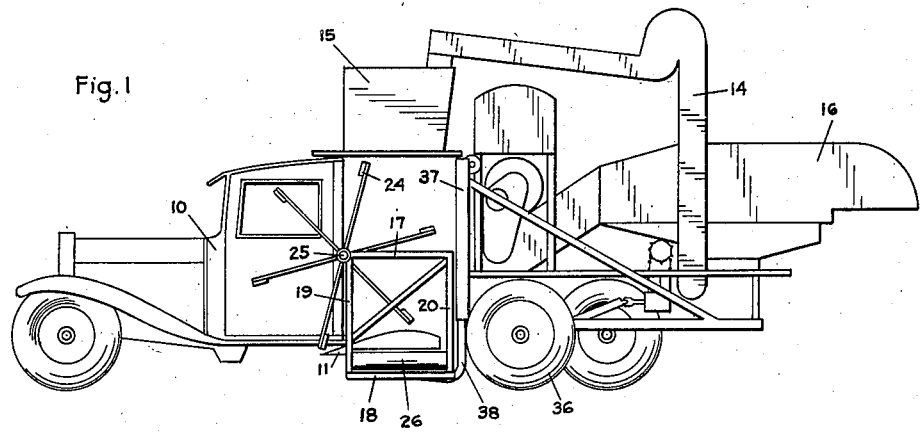

In my drawings the truck of conventional form is designated by numeral 10. To this truck is releasably secured the mechanism for harvesting and thrashing the grain so that all parts will function as a unit. The grain is cut, preferably with little or no stalk by the sickle 11 of the usual type. The heads of grain thus cut will fall on the endless conveyer 12 and then be carried upwardly between the endless conveyers 12 and 13 for delivery into the separating mechanism. After the grain is separated from the chaff and straw, the thrashed grain is conveyed upwardly through an elevator 14 to the grain receptacle 15. The chaff and straw are thrown out by the straw rack 16.

The separating mechanism including the prime mover is independent structurally of the harvesting mechanism. All parts of the separating mechanism are secured together so that the separating mechanism as a unit may be releasably secured to the chassis of a commercial truck or removed therefrom without disturbing the harvesting mechanism or without the necessity of any change in the harvesting mechanism except adjustment of the drive. It should also be noted that my purpose is to provide a balanced construction in the separating mechanism so as not to disturb the balanced condition of the truck.

The frame of the harvesting mechanism includes two rectangles each having a top rail 17, a bottom rail 18, a front rail 19, and a rear rail 20, the two rectangles being connected together as by beams 21. Except for the bottom the frame for the harvesting mechanism is in the skeleton form of a parallelopiped. The bottom is heavily braced with angle irons 22 secured to which is a sheet metal floor 23, both to be subsequently described in detail. The reel 24 is secured to a shaft 25 which is journalled in the top portions of the rails 19. Journalled in the beams 21 are two rollers 26 and 26', which carry the endless belt platform 12. The drive shaft 28 is also journalled in the beams 21.

Figure 2:
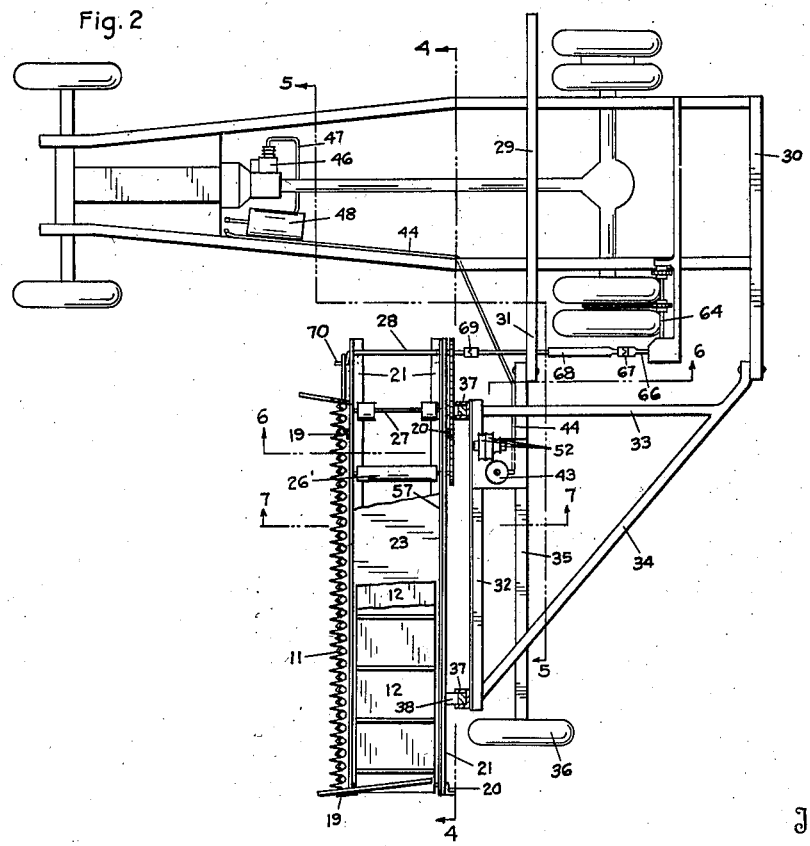
Figure 2 is a plan view of the truck chassis and of the harvesting mechanism of my combine.
Figure 7:
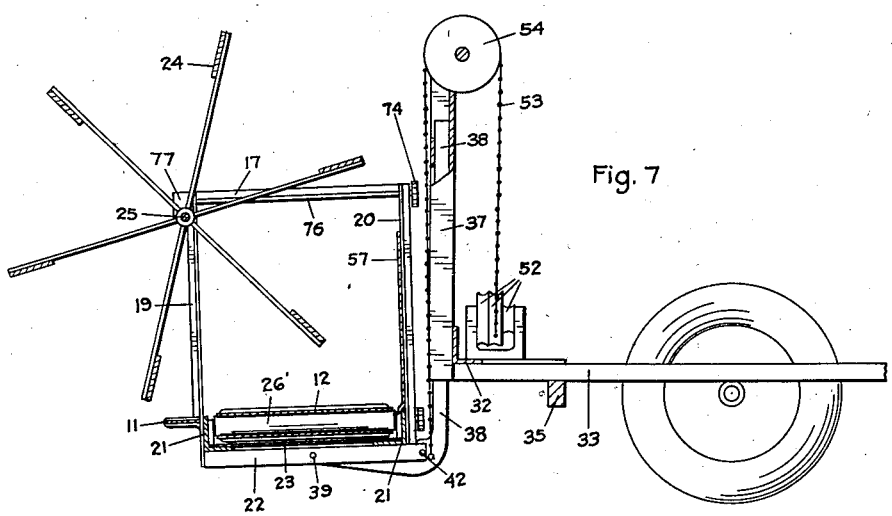
Figure 7 is an enlarged sectional view on the line 7—7 of Figure 2 as seen when looking in the direction of the arrows.
Figure 8:
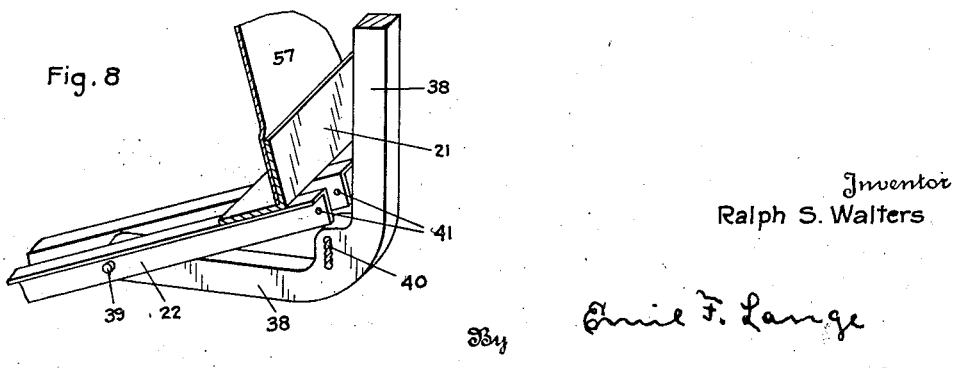
Figure 8 is a view in isometric projection of a fragmentary detail showing the adjustable connections for adjustably tilting the harvesting mechanism.

The harvesting mechanism is secured to the beams 29 and 30 which are transverse to the truck chassis and rigidly secured thereto. The beam 29 is positioned at a level above that of the beam 30 and it is therefore provided with a downturned gooseneck 31 for the purpose of clearing some of the adjusting mechanism to be subsequently described. The outer extremities of the beams 29 and 30 are thus positioned in horizontal alignment as well as in vertical alignment. Pivotally secured to the beams 29 and 30 at their outer extremities is a triangular supporting frame including a transverse beam 32, a beam 33 which is parallel to the line of draft and a transverse beam 34 connecting the beams 32 and 33. The beam 35 is rigidly secured to the triangle in parallel relation to the beam 32 and it carries the auxiliary supporting wheel 36 at its outer extremity. The beams 34 and 35 are pivotally secured to the beams 30 and 31 to allow for up and down movement of the harvester frame when the machine is traveling over uneven soil. At the forward edge of the triangle there are two uprights 37 the position of which is best shown in Figure 2. Each of these uprights is in channel form and these uprights are rigidly braced by any suitable bracing means. These uprights 37 serve as guideways for the up and down movement of the L-shaped supports 38 as best shown in Figures 7 and 8. The supports 38 are pivotally connected at 39 with the angle irons 22 at the bottom of the harvesting mechanism. The harvesting mechanism is thus pivotally secured to the support, the pivotal axis being positioned to substantially balance the harvesting mechanism on the support. The device is so arranged as to make possible the tilting of the harvesting mechanism to any desired angle, means also being provided to latch the harvesting mechanism in any position of adjustment. The support 38 is provided with a plurality of apertures 40 which may register in succession with the apertures 41 of the angle irons 22. The pin 42 is then inserted in the registering apertures to hold the parts in adjusted relative position.

The length of the grain stalks varies between rather wide limits and for this reason it is desirable that the cutting mechanism be made adjustable in height. This is especially true in the case of combines which are designed for cutting the heads of the grain without harvesting a material portion of the straw. Because this variation is often found in the same field, the adjustment must be quickly responsive and so arranged that the driver of the truck may adjust the cutting mechanism to the height of the grain in the various patches as he approaches them. The supports 38 are movable up and down in the uprights 37. An air jack 43 is connected through an air conduit 44 to a three-way valve 45 within convenient reach of the driver of the truck. The air compressor 46 is operated by the engine of the truck and the air thus compressed is conducted through the pipe 47 to a reservoir 48 connected to the valve 45. Operation of the valve 45 will thus either force the air into the jack 43 or it will drain the air from the jack when the harvesting mechanism is lowered under its own weight. The air jack has a movable piston stem 49 having a hook 50 for connection with the end of a chain 51. The platform which carries the air jack 43 also supports a plurality of sheaves 52, two of the sheaves being equal in diameter but greater than the smaller sheave, the ratio of the circumferences being as two to one. The sheaves are integral and concentric. The lower end of the chain 51 is wound around the smallest of the three sheaves 52 with its end secured thereto. Secured to one of the larger sheaves is the end of a chain 53 which passes over a pulley 54 and then downwardly to its connection with the support 38 as shown in Figure 7. The rotation of the sheaves thus tends to lift the support 38, the movement being guided by the channel iron upright 37. The chain 53' is connected to the second of the larger sheaves 52, passing under an idler 55 and over a pulley 56 and then downwardly to the second of the two supports 38. It will thus be apparent that the compressed air in the jack 43 will force the piston stem 49 upwardly and thus exert tension through the chains 53 and 53' causing the elevation of the harvesting mechanism relative to the triangular supporting platform for the harvester. It will also be apparent that the valve 45 may be turned to release the air and thus permit the harvesting mechanism to descent under its own weight and that the operator is thus enabled to stop the descent of the harvesting mechanism at any point desired. It will also be evident that the mechanism for raising and lowering the harvesting mechanism is of convenient access to the driver of the truck and that the operation is almost instantly responsive to the movements of the valve 45.

The grain cut by the sickle is dropped onto the upper surface of the upper run of the endless conveyer 12. In order to prevent the grain from moving rearwardly and over the rear edge of the harvester frame, I provide a rear shield 57 which confines the cut grain to the platform 12. As shown in Figure 4 there is an elevator frame 58 pivotally secured to the platform by means of a shaft 27 and passing into and resting freely on a wall of the feed house of the combine. Other rollers journalled in the elevator 58 are numbered 59, 60 and 61. The elevator frame 58 is also provided with hold-downs 62 for giving the proper clearance between the conveyer 12 and the roller 61. In the operation of the implement as a combine the grain is carried into the thrashing mechanism as shown in Figure 4. There are times, however, when the grain must be cured after cutting and before thrashing, the usual practice being to dispose of the grain in windrows on the stubble where it is to be picked up later with a pick-up attachment for delivery to the thrashing machine.

The implement as above described is adapted for swathing the grain whenever it is desired to cure the grain before thrashing. The separating mechanism as a unit may be lifted off from the chassis of the truck to do away with the necessity of hauling the heavy separating mechanism over the rough field. A section at the inner end of the sheet metal floor 23 may be removed. The endless conveyer 12 is in the form of lengths which are secured together by means of straps and buckles in a manner familiar to every user of similar machines. The conveyer 12 must thus be shortened to terminate beyond the roller 26' so that the grain will be carried over the roller 26' and deposited in a swath on the stubble beyond the roller 26'.

Figure 6:
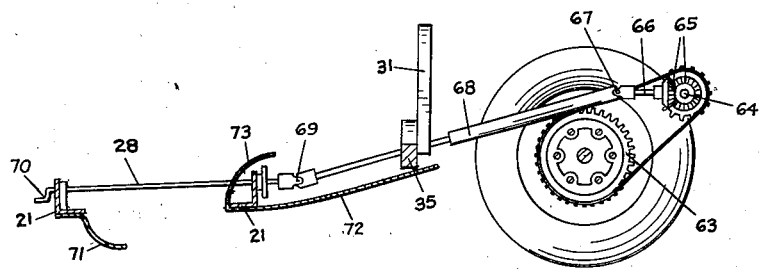
Figure 6 is a sectional view on the line 6—6 of Figure 2 looking in the direction of the arrows.

The power for driving the cutting and conveying mechanism during the swathing is derived from the rear axle and preferably from between the dual wheels at one side of the truck as best shown in Figure 2. Referring now to Figure 6, it will be seen that the rear axle of the truck is provided with a sprocket wheel 63 which transmits power through a sprocket chain to the shaft 64. Through the bevelled gears 65 the power is transmitted to a short shaft 66 which is connected through a universal joint 67 with a splined shaft 68. The second universal joint 69 connects the shaft 68 with the shaft 28. By this means the shaft 28 communicates the power for driving the platform and reel through the connections shown in Figure 4A. The shaft 28 terminates in a crank 70 which in turn drives the cutting mechanism 11. The construction thus permits limited pivotal movement of the driving mechanism about the axis of the shaft 64 during the raising and lowering of the harvesting mechanism. The purpose of the gooseneck 31 is to afford clearance for the splined shaft when it is elevated. Immediately in the rear of the cutting mechanism is a deflector 71 which bends the stubble forwardly during the cutting operation. The mechanism is further shielded by means of the shields 72 and 73 which prevent the grain from clogging the shaft 68 and the associated mechanism.

When the implement is used as a combine the conveyers are driven through connections shown in Figure 4. The rollers 59 and 61 are provided with sprocket wheels but the rollers 26, 26' and 60 are idle. At 74 is another sprocket wheel, the sprocket chain 75 passing over the sprocket 74, under the sprocket 61, around the sprocket 59, and thence under the drive sprocket 28. The reel is driven by the shaft 76 of the sprocket wheel 74 operating through a gear box 77 on the reel shaft 25 as best shown in Figure 7. Regardless of whether the implement is used as a swather or a combine, the power is applied to the drive shaft and sprocket 28 to give rotation to all of the rollers.

The present invention is in the nature of an improvement on the combine which I show and describe in my prior Patent No. 1,859,759, granted May 24, 1932. The present construction differs from that of my prior patent in several important respects. In the prior patent I employ a thrust cut mower positioned in front of the truck while in the present case I place the harvesting mechanism at the side of the truck and in the driver's range of vision so that the driver can observe the operation of the harvesting mechanism at all times. Then too, the prior combine was not specifically adapted for use as a swather whereas the present implement is capable of use as a swather or as a combine or as a separator. In fact the entire mechanism is convertible, even the truck being adapted for its normal use as a truck by simply removing the various implement parts.

The ordinary combine is generally complete in itself and it is not convertible to be used for any of the various purposes. As a rule, the season for operating a combine is very short so that the capital investment must be spread over a long period of idle time. The great advantage of the present implement is that when the season is over, the implement may be removed from the truck and the truck may then be used as a truck or for operating any other machines or implements. Since most farmers already own a truck or have access to a truck for limited periods, the capital investment is confined merely to the harvesting and separating mechanism.

Having thus described my invention in such full, clear, and exact terms that its construction and operation will be readily understood by others skilled in the art to which it pertains, what I claim as new and desire to secure by Letters Patent of the United States is:

1. A combined harvester and thrasher including a truck and harvesting and thrashing mechanisms with a releasable connection for securing said harvesting mechanism at the driver's side of said truck, said harvesting mechanism including a cutter and a reel and a conveyer belt in transverse alignment with the driver's seat of said truck whereby all steps of the harvesting operation are at all times in view of the driver of the truck, pneumatic means for elevating or lowering said harvesting mechanism, said pneumatic means having a control in the cab of said truck within convenient reach of the driver, a compressor driven by the truck engine for supplying compressed fluid to said pneumatic means, separating mechanism in the form of a balanced unit resting on said truck in rear of the cab thereof and serving to balance said truck with respect to said harvesting mechanism, and a grain bin and a conveyer for the delivery of the grain from said thrashing mechanism to said grain bin, said grain bin being secured to the cab roof of said truck.

2. A combined harvester and thrasher including a truck having a rear axle, harvesting mechanism, means for releasably connecting said harvesting mechanism to said truck at one side thereof, a separating mechanism carried by and detachably secured to said truck, a conveyor for elevating and delivering the cut grain from the harvesting mechanism to the separating mechanism, means for raising and lowering said harvesting mechanism with respect to said truck, and a power takeoff shaft operatively connected to said rear axle of said truck and to said harvesting mechanism, said elevating conveyor, and said thrasher, said shaft being provided with a pair of flexible joints to permit said adjustment of the elevation of said harvesting mechanism.

3. A combined harvester and thrasher including a truck having a rear axle, harvesting mechanism, means for releasably connecting said harvesting mechanism to said truck at one side thereof, a separating mechanism carried by and detachably secured to said truck, a conveyor for elevating and delivering the cut grain from the harvesting mechanism to the separating mechanism, a fluid operated motor for raising and lowering said harvesting mechanism with respect to said truck, a fluid compressor for delivering compressed fluid to said motor means connecting the engine of the truck to said compressor to drive the same, a valve located in the driver's compartment of said truck for controlling the flow of fluid to said motor, and a power takeoff shaft operatively connected to said rear axle of said truck and to said harvesting mechanism, said elevating conveyor, and said thrasher whereby all operative parts of said harvester and thrasher are driven by said truck engine.

4. A harvester including a truck having a rear axle, harvesting mechanism, a triangular frame therefor having a wheel at its outer end, means for pivotally connecting one side of said triangular frame to said truck at one side thereof, a separating mechanism carried by and detachably secured to said truck, a conveyor for elevating and delivering the cut grain from the harvesting mechanism to the separating mechanism, means for raising and lowering said harvesting mechanism with respect to said frame, a power takeoff shaft operatively connected to said rear axle of said truck and to said harvesting mechanism, said elevating conveyor, and said thrasher, said shaft being mounted adjacent the pivotal axis of said triangular frame and being provided with a flexible joint to permit said adjustment of the elevation of said harvesting mechanism with respect to said frame.

5. A harvester including a truck having a rear axle, a supporting frame detachably secured to the side of said truck and having a wheel at its outermost end, said frame comprising a plurality of vertical channel members, a plurality of L-shaped members each having one leg thereof slidably disposed within one of said channel members, a frame of rectangular cross-section pivotally secured to the other legs of said L-shaped members, harvesting mechanism carried by said last mentioned frame, means for adjustably securing said last mentioned frame in any one of a number of predetermined angular positions with respect to said L-shaped members, a fluid operated motor for raising and lowering said L-shaped members in said channel members to raise and lower the harvesting mechanism, a compressor connected to the engine of said truck for supplying compressed fluid to said motor, a valve located in the driver's compartment of said truck for controlling the operation of said motor, and means for connecting said rear axle of said truck to said thrashing mechanism to operate the same.

6. A harvester including a truck having a rear axle, a triangular supporting frame detachably secured along one side thereof to the side of said truck and having a wheel at its outermost end opposite said side, said frame comprising a plurality of vertical channel members, a plurality of L-shaped members each having one leg thereof slidably disposed within one of said channel members, a frame of rectangular cross section pivotally secured to the other legs of said L-shaped members, harvesting mechanism carried by said last mentioned frame, means for adjustably securing said last mentioned frame in any one of a number of predetermined angular positions with respect to said L-shaped members, a fluid operated motor for raising and lowering said L-shaped members in said channel members to raise and lower the harvesting mechanism, a compressor connected to the engine of said truck for supplying compressed fluid to said motor, a valve located in the driver's compartment of said truck for controlling the operation of said motor, and a shaft connected to said rear axle of said truck and to said thrashing mechanism for driving the latter, said shaft extending close to the pivotal axis of said triangular frame.

7. A combined harvester and thrasher including a truck having a rear axle, a supporting frame detachably secured to the side of said truck and having a wheel at its outermost end, said frame comprising a plurality of vertical channel members, a plurality of L-shaped members each having one leg thereof slidably disposed within one of said channel members, a frame of rectangular cross section pivotally secured to the other legs of said L-shaped members, harvesting mechanism carried by said last mentioned frame, means for adjustably securing said last mentioned frame in any one of a number of predetermined angular positions with respect to said L-shaped members, a fluid operated motor for raising and lowering said L-shaped members in said channel members to raise and lower the harvesting mechanism, a compressor connected to the engine of said truck for supplying compressed fluid to said motor, a valve located in the driver's compartment of said truck for controlling the operation of said motor, and means selectively operable to connect said rear axle of said truck to said thrashing mechanism and said conveyor alone or to said thrashing mechanism, said conveyor and said separating mechanism.

RALPH S. WALTERS.